United States Patent [19]

Lewis, Jr. et al.

[11] 3,895,935

[45] July 22, 1975

[54] PROCESS FOR ELECTROSLAG REFINING OF URANIUM AND URANIUM ALLOYS

[75] Inventors: Philip S. Lewis, Jr., Oak Ridge; William A. Agee, Jacksboro; Jonathan S. Bullock, IV; James B. Condon, both of Oak Ridge, all of Tenn.

[73] Assignee: The United States of America as represented by the United States Energy Research and Development Administration, Washington, D.C.

[22] Filed: Dec. 16, 1974

[21] Appl. No.: 533,111

[52] U.S. Cl. .................. 75/10 R; 75/10 C; 75/84
[51] Int. Cl.² ................................... C22B 4/00
[58] Field of Search ................... 75/10–12, 84, 75/84.4, 84.5, 122.7; 164/50, 52, 250, 252

[56] References Cited
UNITED STATES PATENTS 2,541,764  2/1951  Herres ............................. 75/10 C
3,496,280  2/1970  Dukelow ........................... 75/10 R
3,715,201  2/1973  Schlatter .......................... 75/10 R
3,723,094  3/1973  Schlatter .......................... 75/12

FOREIGN PATENTS OR APPLICATIONS 979,583  1/1965  United Kingdom ................. 75/10 R

OTHER PUBLICATIONS

Duckworth & Hoyle, "Electro-Slag Refining," p. 154, (London, 1969).

Primary Examiner—Peter D. Rosenberg
Attorney, Agent, or Firm—Dean E. Carlson; David S. Zachry; Earl L. Larcher

[57] ABSTRACT

The development relates to a process for electroslag refining of uranium and uranium alloys wherein molten uranium and uranium alloys are melted in a molten layer of a fluoride slag containing up to about 8 weight percent calcium metal. The calcium metal reduces oxides in the uranium and uranium alloys to provide them with an oxygen content of less than 100 parts per million.

5 Claims, No Drawings

PROCESS FOR ELECTROSLAG REFINING OF URANIUM AND URANIUM ALLOYS

The present invention relates generally to an electroslag refining process for uranium and uranium alloys, and more particularly to such a process where scrap material is refined in such a manner that the oxygen content therein is reduced to less than about 100 parts per million (ppm). The present invention was made during the course of, or under, a contract with the United States Atomic Energy Commission.

Recycling scrap uranium materials, including alloys thereof such as uranium - 7.5 wt. % niobium - 2.5 wt. % zirconium; uranium - 6 wt. % niobium; uranium - 0.75 wt. % titanium; uranium - 2.5 wt. % niobium, is very attractive for economic reasons since such materials, especially some of the alloying constituents, are relatively expensive. Recycling scrap uranium material into usable configurations can be achieved with relative ease by employing such process as vacuum arc, induction melting, or skull casting. However, this recycled material has often contained quantities of impurities, particularly oxides, excessive for utilization in many applications. For example, in such earlier efforts, the consolidation of bulk scrap of Mulberry, i.e., a uranium alloy consisting of uranium - 7.5 wt. % niobium - 2.5 wt. % zirconium, the niobium and zirconium were highly segregated and large oxide inclusions were found in induction-melted ingots of the alloy, while massive oxide agglomerates were formed in ingots prepared by vacuum-arc melting. Some success was realized by recycling only low oxide scrap consolidated by skull melting since ingots vacuum-arc remelted from skull-cast electrodes exhibited a relatively low impurity level. However, it was found this process was unacceptable for recycling scrap material containing relatively large concentrations of oxides (oxygen content greater than about 100 ppm) since the oxygen content was not reduced, so that the resulting ingots frequently contained an unacceptable amount of agglomerated oxides.

Inasmuch as attempts to recycle scrap uranium material, particularly uranium alloys, have been relatively unsuccessful due to the presence of large oxide concentrations in the electrodes, that were not removable by subsequent vacuum-arc remelting, it appeared that electroslag refining or remelting might be advantageously used in a scrap recycle process to purify the uranium material which included the removal of these oxide inclusions. Generally, electroslag melting, as will be described in greater detail below, is practiced by initially arc melting an electrode of the desired metal or alloy in a suitable crucible within a furnace; as a pool of the metal or alloy is formed in the crucible a suitable slag or slagging material is introduced into the crucible and melted to form a pool of molten slag. The continued melting of the electrode forms droplets of the metal or alloy in the slag which pass through the liquid pool for purification by the chemical gettering action of the slag material. In electroslag refining the slag normally provides a cover for the molten metal or alloy pool and eliminates the costly vacuum systems that are required for vacuum-arc melting. However, since uranium is a very active and highly toxic metal, electroslag melting must be conducted in a closed system with a protective environment of an inert gas such as argon or helium. Also, the furnace pressure should be at least one-third atmosphere to avoid excessive volatilization of the slag materials and less than two-thirds atmosphere to effect the removal of volatile impurities.

In electroslag refining the above-mentioned uranium-niobium-zirconium alloy, coupons of a thickness of 0.125 inch were prepared by the vacuum-arc remelting scrap alloy. Radiographs of these coupons showed numerous large oxide inclusions which tended to segregate at the center of the casting. Several electrodes of this vacuum-arc remelted scrap were remelted in the electroslag refining process using reagent grade calcium fluoride slag. Radiographs of ingots resulting from the electroslag melting indicated the ingots were free of the large oxide inclusions. However, metallographic examination of the ingots revealed that oxide was present as fine, uniformly distributed particles and a chemical analysis of the remelted alloy showed a very uniform distribution of oxygen throughout cross sections of the ingot. The oxygen content of the electrodes was difficult to establish because the oxide segregates at the center of castings, but since the large oxide inclusions had been eliminated by the electroslag refining process, the total oxygen content of the ingots was assumed to be no higher than that of the electrodes. A review of the oxygen analysis indicated that the oxygen content of the alloy had actually increased during the electroslag refining melts. These data showed that the electroslag refined ingot contained an average of 180 ppm oxygen, while vacuum-arc remelted ingots made from similar electrodes contained an average of 135 ppm oxygen. Vacuum-arc remelted ingots made from 100% raw materials contained an average of 70 ppm oxygen.

Accordingly, it is the primary aim or goal of the present invention to provide an improved electroslag refining process which is capable of considerably reducing the oxygen content of scrap consisting of uranium and uranium alloy material and which also produces a homogeneous ingot. This goal is achieved by the step of admixing calcium metal with a slagging material of calcium fluoride, with the calcium metal being in an amount effective to react with and reduce the oxides in the recycled uranium or uranium alloys to an oxygen concentration of less than 100 ppm.

Other and further objects of the invention will be obvious upon an understanding of the illustrative method about to be described, or will be indicated in the appended claims, and various advantages not referred to herein will occur to one skilled in the art upon employment of the invention in practice.

Described generally, the present invention is directed to an improved electroslag refining process for remelting scrap uranium and uranium alloys whereby the oxygen content of these scrap materials is reduced to a level below 100 ppm. As briefly described above, the scrap uranium material in the form of machine turnings, chips, recycled articles, and the like is melted in any suitable manner such as arc, skull, or induction melting to form electrodes of a configuration usable in the electroslag melting operation. This electroslag melting operation may, in turn, be conducted in a conventional vacuum-arc furnace wherein electrode melting may be employed and which has been modified to allow for slag feeding. The furnace which can operate under vacuum or a partial pressure of an inert gas such as argon or helium is coupled with a power supply suitable for melting the electrode. Tests were conducted with a power supply consisting of ten d.c. units arranged to furnish 10,000 amps at 40 volts. These units or rectifiers are controlled as a single unit during a melt, but changes in voltage or current during the melt may be made manually or by using a suitable automated control. Also, the drive for feeding the electrode into the furnace may be controlled manually or by voltage using a preset reference voltage. The electrode melting in the furnace takes place within a water-cooled crucible formed of a suitable electrical conducting material, such as copper, which resists contamination of the uranium material. Further, the furnace may be provided with suitable melt stirring mechanisms such as electromagnetic stirring coils having a 0 to 25 gauss capability for single, cyclic, or double mode stirring. The furnace is designed for dry slag starts by providing it with a separate chamber containing a hopper for holding the slag materials, a mechanism, such as a vibrator chute, for controlling the feed rate and delivery of the dry slag to the crucible, and a ball valve for isolating the chamber from the furance proper. A suitable vibrator may be attached to the slag storage hopper to eliminate bridging. However, the entire slag batch may be introduced into the furnace at the start of a melt or make-up additions may be added during the run.

Since uranium is a very active metal, the list of materials suitable for the slag is short in that most of the common components of commercially available slags are eliminated because of the reactivity of uranium with oxide-containing materials. This factor coupled with vapor pressure restrictions at operating temperatures and pressures generally limits the choice of slags to the following fluorides: lithium fluoride (LiF), strontium fluoride ($SrF_2$), calcium fluoride ($CaF_2$), magnesium fluoride ($MgF_2$), and rare earth fluorides. These slagging materials are listed in order of increasing acidity with calcium fluoride considered as neutral.

It was found that the $CaF_2$ was the most suitable material for electroslag melts with uranium material since it is economically available, has a lower vapor pressure than other candidate materials, melts at a temperature (1,400°C) suitable for uranium material as listed above, and is inert to molten uranium. Attempts to use combinations of slags have not proven to be satisfactory; for example, several unsuccessful attempts to use such slags as a eutectic calcium-flouride-magnesium-fluoride composition (52 wt. % $CaF_2$ - 48 wt. % $MgF_2$) and other $CaF_2$ - $MgF_2$ mixes have not been as successful as the $CaF_2$ slag.

In order to prepare the slags, the $CaF_2$ is prefused by induction melting in a graphite crucible under argon at atmospheric pressure, crushed, and then screened to 20 mesh. When a large quantity of unmelted slag was trapped in the bottom of several of the first ingots, it appeared that a larger grain size slag might melt better; but careful feeding of the slag into the furnace and the use of electromagnetic stirring provided for complete melting of the fine slag.

As noted above, the electroslag melting of uranium materials broke up the oxide inclusions and agglomerates normally found in the recycled electrodes prepared by skull and arc melting scrap of uranium material but at the same time did not effectively reduce the oxygen content in the material. It was found that the electroslag melting process could be modified to provide for a significant reduction in the oxygen content in the recycled uranium material. This modification is achieved by employing calcium metal in the calcium fluoride slag for reducing the oxides in the metal droplets as they pass through the slag during electroslag melts. This calcium metal-containing slag may be readily provided by using a mechanical mixture of prefused $CaF_2$ and metallic Ca granules in the size range of 3 mesh to 20 mesh. By using calcium metal in the slag there is achieved a significant reduction in the oxygen content of uranium material in electroslag melts. For example, with the above-mentioned high oxide Mulberry alloy, oxygen residuals are consistently equal to or lower than the 70 ppm average for vacuum-arc melted ingots made from 100% raw materials. The calcium metal requirement is based upon the total oxygen content of the slag and the metal. An excess quantity of calcium metal may be used to ensure a low oxygen content in the processed alloy since there have been no indications of a calcium residual in the alloy for melts with as much as 50% excess calcium metal. All analyses of the electroslag ingots have shown a calcium content of less than 10 ppm (0.001 percent), the minimum detection level for routine analyses for calcium metal.

Slag temperatures average about 2,000°C during an electroslag melt, during which, it is believed, that much of the calcium metal, which boils at 1,440°C, vaporizes and condenses on the crucible walls above the molten slag. As melting proceeds, the calcium metal on the walls is remelted and enters the slag, simulating a continuous make-up addition. While there are probably limits to the amount of calcium metal that may be added in the initial slag, there have been no difficulties with slags containing up to about 8 wt. % Ca metal. It is believed that a continuous make-up addition would be more suitable for melts requiring more than this level of calcium and for melts of relatively long duration.

There are significant differences between electroslag melts without calcium metal in the slag and those with calcium metal. All melts are begun as arc melts and during this period there are large fluctuations in the melt power voltage and current. As the slag pool forms during melts without calcium metal, these fluctuations gradually diminish and, when the electrode is properly positioned in the slag, the voltage and current are very steady. The tips of these electrodes have a characteristic conical shape. However, there are large fluctuations in melt power voltage and current throughout melts with calcium metal in the slag. It is believed that this is due to calcium metal vaporizing in the slag. The ends of the electrodes are flat, much like vacuum-arc melted electrode stubs, but there is a slag coating on the stubs indicating that they were positioned in the slag. The slag residues are primarily $CaF_2$ and CaO. These tend to crumble into powder on standing and are easily cleaned from the ingot surfaces. The uranium content of these slags is low, usually less than 0.2%, and there are practically no metal particles in the slag caps. The ingot surfaces are generally smooth and bright, almost as if polished, but the surfaces are wavy, indicating that the slag coating is not of a uniform thickness.

A calcium metal addition to the slag in the range of about 4 to 8 wt. % has been found to be sufficient for reducing the oxygen content of recycled scrap uranium and uranium alloys, such as mentioned above, to a value of less than 100 ppm and often as low as about 40 ppm. Of course, if the uranium material is oxidized to a level greater than usually found in recycle material a greater quantity of calcium metal may be added to the slag as the melt proceeds.

In order to provide a clearer understanding of the present invention, an example directed to the electroslag refining of scrap uranium - 7.5 wt. % niobium - 2.5 wt. % zirconium alloy (Mulberry) is set forth below.

EXAMPLE

Two electrodes were skull cast from scrap material of the Mulberry alloy with these electrodes being 5.125 inches in diameter, 36 inches in length, and a weight of approximately 200 kilograms. Chemical analyses of the electrodes indicated an average oxygen content of 87 ppm. A slag mixture formed of 93.2 wt. % calcium fluoride (20 mesh) and 6.8 wt. % calcium metal in granular form (3 to 20 mesh) was mechanically blended for use in the melting operation. An 8-inch vacuum furnace having a hopper attached thereto in registry with the furnace interior was utilized for the electroslag remelting operation and was prepared for the electroslag remelting operation by loading the slag mixture into the slag hopper. A small quantity of Mulberry alloy scrap was placed in the bottom of a 7-inch copper crucible in the furnace for initiating the arc. After the electrode was fastened to a ram electrode feeder and positioned in the crucible, the vacuum furnace was closed and evacuated to less than 10 microns pressure, leak checked, and then backfilled with argon to a pressure of approximately 0.5 atmosphere absolute. The melting operation was initiated at 25 volts and after a 1 minute duration produced a molten pool of the alloy in the crucible. Then, about 7 kilograms of the slag mixture were fed into the crucible with the electrode being maintained at 20 to 25 volts for about 6 minutes to liquidize the slag. After the slag was melted, the voltage was maintained in the range of 17 to 23 volts to complete the electrode melting which required about 35 minutes. Alloy ingots approximating 6.875 inches in diameter and 20 inches in length were formed. These ingots were examined by radiography, chemical analyses, and cursory physical-property tests. In the radiographic tests, coupons 0.125 inch in thickness which were prepared from vertical slices obtained from the center of these ingots were free of oxide inclusions. Chemical analyses of the ingot showed an average oxygen content of 36 ppm which compares to an average of 70 ppm of oxygen in ingots prepared from virgin metals. In chemical analyses for the components of the alloy, the uranium, niobium and zirconium metals were found to be more homogeneously dispersed throughout the ingot than in vacuum-arc remelted ingots. Data from the cursory physical-property tests indicated that the physical and mechanical characteristics were about the same as for ingots prepared by the vacuum-arc melting process.

It will be seen that the present invention provides a significant advancement in the art of refining scrap uranium material particularly uranium alloys since the oxygen content of the alloys can be reduced to levels as low as if not lower than the oxygen content of virgin alloys. Further, while it is well known that the oxides of uranium could be reduced by heating in the presence of calcium, no efficient method was previously available for effectively reducing the oxygen content of uranium alloys such as those listed above. Also, while the oxides of uranium could be so reduced, the content of other impurities in the uranium was not effectively decreased by the calcium metal. Thus, the present improved electroslag refining method offers considerable advantages in recycling uranium metal containing oxides and volatile impurities.

What is claimed is:

1. An improvement in the method of salvaging and refining scrap oxidized uranium material by electroslag melting comprising the steps of forming the scrap uranium material into an elongated electrode, electrically melting uranium material in a crucible within a closed furnace having an atmosphere of inert gas maintained at a subatmospheric pressure for forming a pool of molten uranium material, introducing a granular slag of a fluoride material into said furnace atop said pool of molten uranium material, melting the slag to form a molten body of slag above said pool, electrically melting said electrode within said molten body of slag to form droplets of molten uranium material which pass through said molten body of slag into said pool for forming an ingot of said uranium material, and thereafter separating said ingot from said slag; said improvement being in the step of reducing the oxygen content in the uranium material forming said ingot to a level of less than 100 ppm by incorporating calcium metal in said slag in an amount effective to reduce the oxides in said electrode to said level in said ingot.

2. The improvement in the method claimed in claim 1 wherein said uranium material is a uranium alloy selected from the group consisting of uranium - 7.5 wt. % niobium - 2.5 wt. % zirconium; uranium - 6 wt. % niobium; uranium - .75 wt. % titanium; uranium - 2.5 wt. % niobium.

3. The improvement in the method claimed in claim 1 wherein said slag comprises calcium fluoride and calcium metal.

4. The improvement in the method claimed in claim 3 wherein the said amount of calcium metal incorporated in the slag is in the range of 4 to 8 wt. % of the calcium fluoride-calcium metal mixture.

5. The improvement in the method claimed in claim 3 wherein the calcium metal is of a particulate form in a size range of 3 to 20 mesh and is admixed with the slag prior to the step of introducing the slag into the furnace.

* * * * *